(12) United States Patent
Tokuoka et al.

(10) Patent No.: US 10,519,813 B2
(45) Date of Patent: Dec. 31, 2019

(54) POWER GENERATION APPARATUS

(71) Applicant: Yanmar Co., Ltd., Osaka-shi, Osaka-fu (JP)

(72) Inventors: Yuki Tokuoka, Osaka (JP); Taisuke Ono, Osaka (JP); Takashi Matsuura, Osaka (JP); Masafumi Shinomiya, Osaka (JP); Takayuki Iguchi, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/555,946

(22) PCT Filed: Feb. 26, 2016

(86) PCT No.: PCT/JP2016/055861
§ 371 (c)(1),
(2) Date: Sep. 5, 2017

(87) PCT Pub. No.: WO2016/143558
PCT Pub. Date: Sep. 15, 2016

(65) Prior Publication Data
US 2018/0051595 A1    Feb. 22, 2018

(30) Foreign Application Priority Data
Mar. 6, 2015 (JP) ................... 2015-044343

(51) Int. Cl.
*F01K 9/02* (2006.01)
*F01K 9/00* (2006.01)
(Continued)

(52) U.S. Cl.
CPC ............... *F01K 9/023* (2013.01); *F01K 9/00* (2013.01); *F01K 9/003* (2013.01); *F22B 1/18* (2013.01);
(Continued)

(58) Field of Classification Search
CPC . F01K 9/023; F01K 9/00; F01K 9/003; F22B 1/18; F22B 1/1861; F22B 3/04; F22B 3/06; Y02P 80/154
(Continued)

(56) References Cited

U.S. PATENT DOCUMENTS 3,277,955 A * 10/1966 Heller ..................... F28B 11/00
                                                     137/492.5
3,965,675 A *  6/1976 Martz ..................... F01K 13/02
                                                      60/39.182
(Continued)

FOREIGN PATENT DOCUMENTS

EP     2647938 A1   10/2013
FR     2149819 A5    3/1973
(Continued)

OTHER PUBLICATIONS

International Search Report dated May 24, 2016 issued in corresponding PCT Application PCT/US2016/055861 cites the U.S. Patent and foreign patent documents above.
(Continued)

*Primary Examiner* — Mark A Laurenzi
*Assistant Examiner* — Mickey H France
(74) *Attorney, Agent, or Firm* — Norton Rose Fulbright US LLP

(57) ABSTRACT

Disclosed are power generation apparatuses. An exemplary power generation apparatus (1) is configured such that water vapor generated in a steam generator (2) is supplied to a scroll expander (3) to drive the scroll expander, wherein: a condensation device (5) is arranged in a discharge path (12) downstream of the scroll expander, the condensation device being configured to mix water vapor having passed through the scroll expander directly with cooling water to condense the water vapor; and the condensation device includes a
(Continued)

control unit (10) that performs a control of adjusting the amount of cooling water supply so as to obtain condensed water having a predetermined temperature.

19 Claims, 3 Drawing Sheets

(51) Int. Cl.
    *F22B 1/18* (2006.01)
    *F22B 3/04* (2006.01)
    *F28B 3/06* (2006.01)
    *F22B 3/06* (2006.01)
(52) U.S. Cl.
    CPC .............. *F22B 1/1861* (2013.01); *F22B 3/04* (2013.01); *F28B 3/06* (2013.01); *F22B 3/06* (2013.01); *Y02P 80/154* (2015.11)
(58) Field of Classification Search
    USPC .................................................... 60/660, 670
    See application file for complete search history.

(56) References Cited

U.S. PATENT DOCUMENTS

| | | | | |
|---|---|---|---|---|
| 4,290,390 A | * | 9/1981 | Juzi | F01K 3/22 |
| | | | | 122/122 |
| 4,311,013 A | * | 1/1982 | Kuribayashi | B01D 5/0051 |
| | | | | 122/406.5 |
| 4,353,213 A | * | 10/1982 | Masuda | B01D 5/00 |
| | | | | 60/646 |
| 4,506,508 A | | 3/1985 | Coers et al. | |
| 4,622,820 A | * | 11/1986 | Sundquist | F01K 25/065 |
| | | | | 60/673 |
| 4,873,829 A | * | 10/1989 | Williamson | F01K 9/02 |
| | | | | 60/670 |
| 5,005,351 A | * | 4/1991 | Archer | F28B 1/02 |
| | | | | 60/657 |
| 5,423,377 A | * | 6/1995 | Iwata | F01K 9/00 |
| | | | | 165/110 |
| 5,925,291 A | * | 7/1999 | Bharathan | F28B 3/02 |
| | | | | 261/112.2 |
| 6,484,503 B1 | | 11/2002 | Raz | |
| 2005/0109032 A1 | * | 5/2005 | Harpster | F28B 1/02 |
| | | | | 60/685 |
| 2009/0199557 A1 | * | 8/2009 | Bennett | F01K 3/008 |
| | | | | 60/641.15 |
| 2012/0073291 A1 | * | 3/2012 | Shapiro | F01K 13/00 |
| | | | | 60/641.7 |
| 2014/0190165 A1 | * | 7/2014 | Myogan | F01K 9/00 |
| | | | | 60/657 |
| 2014/0216686 A1 | * | 8/2014 | Shelnutt | H05K 7/20809 |
| | | | | 165/67 |
| 2015/0196874 A1 | * | 7/2015 | Temple | B01D 53/78 |
| | | | | 423/210 |
| 2016/0153718 A1 | * | 6/2016 | Batscha | F28B 1/02 |
| | | | | 137/11 |

FOREIGN PATENT DOCUMENTS

| | | | | |
|---|---|---|---|---|
| GB | 1307996 A | * | 2/1973 | ............. F01K 9/003 |
| JP | 51-62205 A | | 5/1976 | |
| JP | 61215407 A | * | 9/1986 | ............... F01K 9/00 |
| JP | H7-158411 A | | 6/1995 | |
| JP | 11-36818 A | | 2/1999 | |
| JP | 2009-114960 A | | 5/2009 | |
| JP | 2010-159713 A | | 7/2010 | |
| JP | 2011-517742 A | | 6/2011 | |
| WO | 2015/029725 A1 | | 3/2015 | |

OTHER PUBLICATIONS

European Search Report dated Mar. 16, 2018 issued in corresponding European Application No. 16761529.3 cites the patent documents above.

\* cited by examiner

POWER GENERATION APPARATUS

CROSS REFERENCES TO RELATED APPLICATIONS

This application is a national stage application pursuant to 35 U.S.C. § 371 of International Application No. PCT/JP2016/055861, filed on Feb. 26, 2016, which claims priority under 35 U.S.C. § 119 to Japanese Patent Application No. 2015-044343, filed on Mar. 6, 2015, the disclosures of which are hereby incorporated by reference in their entireties.

TECHNICAL FIELD

The present invention relates to a power generation apparatus that utilizes water vapor.

BACKGROUND ART

In a power plant facility using a diesel engine, generally, power equipment including a steam turbine in addition to the diesel engine is known, the steam turbine configured to generate electric power with use of a steam produced by waste heat of the diesel engine.

Such power equipment including a steam turbine for generating electric power with use of a steam produced by waste heat conventionally includes: a steam turbine that recovers power from a produced steam; a generator that uses the power to generate electric power; a condenser that condenses the steam after the steam passes through the steam turbine; a condensation tank that stores drainage after the condensation; and a pump that sends water stored in the condensation tank.

In a large-scale power equipment, such a power plant has been proposed that a turbine plant using, as an operating fluid, water vapor obtained by combusting hydrogen and oxygen directly introduces water to a condenser, to thereby raise the pressure of an exhaust gas in a path after passing through the turbine, thus lowering the compression ratio and obtaining hot water discharge (see PTL1, for example).

CITATION LIST

Patent Literature

PTL1: Japanese Patent Application Laid-Open No. H7-158411 (1995)

SUMMARY OF INVENTION

Technical Problem

In large-scale electric power generation in which water vapor obtained by combustion of hydrogen and oxygen is used as an operating fluid as in the conventional power plant mentioned above, a steam has a temperature of 1300° C. or more, and therefore a primary purpose of directly introducing water to a condenser is to lower the compression ratio. Resulting hot water discharge, therefore, is a large amount of high-temperature water which is boiling at a temperature of 100° C. or more, and it is impossible to manage, control, and adjust hot water discharge at a predetermined temperature.

In small-scale power equipment using waste heat of a diesel engine, on the other hand, the compression ratio does not have to be taken into consideration because the temperature of the waste heat is not as high as in the large-scale electric power generation described above, but it is necessary to reduce costs by simplifying the configuration of the power equipment itself because the unit price per electricity output is higher than that of the large-scale power plant.

The present invention has been made in view of the actual circumstances described above, and aims to provide a power generation apparatus for a small-scale power equipment that utilizes waste heat, the power generation apparatus having a simplified configuration in which a condenser is omitted so that water is directly introduced to a condensation tank, the power generation apparatus configured to manage and control the amount of water to be introduced so as to enable efficient supply of electricity and condensed water in accordance with demands.

Solution to Problem

To solve the problems described above, a power generation apparatus according to the present invention is a power generation apparatus configured such that water vapor generated in a steam generator is supplied to an expander to drive the expander, wherein: a condensation device is arranged in a path downstream of the expander, the condensation device configured to mix water vapor having passed through the expander directly with cooling water to condense the water vapor; and the condensation device includes a control unit that performs a control of adjusting the amount of cooling water supply so as to obtain condensed water having a predetermined temperature.

In the above power generation apparatus, the condensation device may be provided with means for detecting the height of a liquid level, and the control unit is configured to control, based on the height of the liquid level, the rotational frequency of a pump that sends a liquid out of the condensation device.

In the above power generation apparatus, a water vapor introduction pipe extending from the path downstream of the expander may be introduced into the condensation device, and the introduction pipe may have a plurality of perforations formed in its portion below a predetermined water level such that bubbling occurs in a liquid phase below the predetermined water level in the condensation device.

In the above power generation apparatus, an atmospheric air release path including an atmospheric air release valve may be connected to an upper portion of the condensation device.

Advantageous Effects of Invention

In the present invention, a condensation device arranged in a path downstream of an expander mixes water vapor having passed through the expander directly with cooling water to condense the water vapor, and the condensation device is provided with a control unit that performs a control of adjusting the flow rate of the cooling water so as to obtain condensed water having a predetermined temperature, which enables an electric power generation output to be changed by controlling condensation pressure. In addition, condensed water having a desired temperature can be supplied. Accordingly, electricity or condensed water can be supplied in accordance with demands with a simple configuration including no condenser.

DESCRIPTION OF EMBODIMENTS

In the following, embodiments of the present invention will be described with reference to the drawings.

Figure 1:
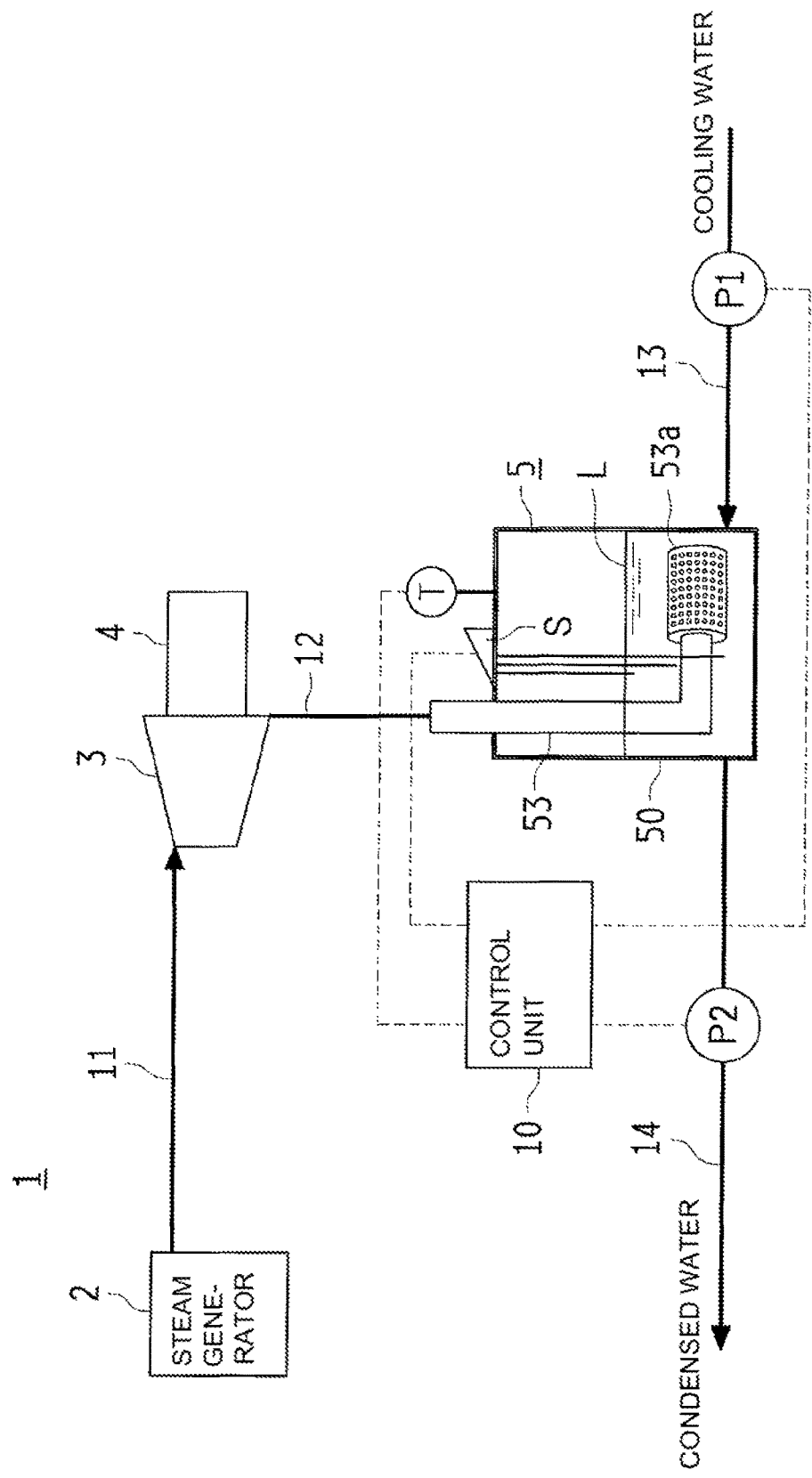
FIG. 1 A diagram schematically showing an overall configuration of a power generation apparatus according to the present invention.

FIG. 1 schematically shows an overall configuration of a power generation apparatus 1 according to the present invention.

The power generation apparatus 1 is configured such that water vapor generated in a steam generator 2 is supplied to a scroll expander 3 so that the scroll expander 3 is driven to cause a generator 4 connected to the scroll expander 3 to generate electric power. A condensation device 5 is arranged in a discharge path 12 which is on the downstream side of the scroll expander 3. The condensation device 5 mixes the water vapor having passed through the scroll expander 3 directly with cooling water supplied from a cooling water supply path 13, thereby condensing the water vapor. The condensation device 5 includes a control unit 10 that controls the rotational frequency of a cooling water pump P1 such that the amount of cooling water supply is so adjusted as to obtain condensed water having a predetermined temperature.

The steam generator 2 is configured such that water vapor generated in the steam generator 2 is supplied to the scroll expander 3 through a water-vapor supply path 11. No particular limitation is put on the steam generator 2, and examples thereof may include: one using engine waste heat to convert water into water vapor; one using geothermal heat to generate water vapor; one using industrial waste heat to generate water vapor; and one using heat of an exhaust gas from an incinerator to generate water vapor.

The scroll expander 3 is configured to be rotated by water vapor supplied through the supply path 11 at a rated rotational frequency of the scroll expander 3, which for example is 1800 to 3600 rpm, the scroll expander 3 being connectable directly with the generator 4.

The generator 4 is not particularly limited as long as it is able to generate electric power by the direct connection with the scroll expander 3. Examples of the generator 4 include various types of generators such as induction generators and synchronous generators. An object to be driven by the scroll expander 3 is not limited to the generator 4, but may be a power output shaft for example.

The condensation device 5 includes a container body 50 for preparing condensed water by mixing water vapor in the discharge path 12 which has passed through the scroll expander 3 with the cooling water supplied from the cooling water supply path 13.

The container body 50 is provided with an introduction pipe 53 extending from the discharge path 12 into the container body 50. A distal end portion 53a of the introduction pipe 53 is located at a position near an interior bottom portion of the container body 50 such that water vapor discharged from the introduction pipe 53 is finely dispersed into bubbling in a liquid phase below a liquid level L of the cooling water introduced to the container body 50. The distal end portion 53a has a plurality of perforations formed throughout an outer peripheral surface thereof. This configuration allows the water vapor supplied from the introduction pipe 53 to be mixed while being finely dispersed into bubbling in the liquid phase of the cooling water within the container body 50. Thus, a shock caused at a time of mixing with the cooling water is reduced. Damage to the container body 50 can be prevented accordingly. In addition, a pressure fluctuation in the container body 50 is suppressed so that condensation pressure is stabilized, which leads to a stabilized electric power generation output. Moreover, generation of an abnormal noise during mixing can also be suppressed.

The container body 50 is provided with the cooling water supply path 13. The cooling water supply path 13 has the cooling water pump P1. The control unit 10 controls the rotational frequency of the cooling water pump P1, thereby adjusting the amount of cooling water to be supplied into the container body 50.

The container body 50 is connected with a condensed water supply path 14 that sends condensed water prepared in the container body 50 from the inside of the container body 50 to the outside. The condensed water supply path 14 has a condensed water pump P2. The control unit 10 controls the rotational frequency of the condensed water pump P2, thereby adjusting the amount of condensed water to be sent to the outside, the condensed water having its temperature adjusted in the container body 50.

The container body 50 is provided with a temperature sensor T and a liquid level detection sensor S that detects the liquid level L in the container body 50. The liquid level detection sensor S includes a plurality of sensors (in this embodiment, three sensors) that are installed at different levels so as to enable detection of the liquid level L at different levels in the container body 50.

The condensation device 5 is configured such that water vapor discharged from the discharge path 12 is mixed directly with the cooling water and thus condensed within the container body 50, thus preparing condensed water having a predetermined temperature. Preparation of the condensed water and sending of the condensed water to the outside are controlled by the control unit 10.

The control unit 10 is configured to control the rotational frequency of the cooling water pump P1 based on a result of detection of the condensed water temperature which is obtained from the temperature sensor T, thereby controlling the amount of cooling water to be supplied into the container body 50, thus preparing condensed water (for example, cold water or hot water) having a predetermined temperature. The control unit 10 is also configured to control the rotational frequency of the cooling water pump P1 based on a result of detection of the condensed water temperature which is obtained from the temperature sensor T, thereby controlling the amount of cooling water to be supplied into the container body 50, thus controlling the condensation pressure in the container body 50 to be a predetermined condensation pressure. Such a control of the condensation pressure concurrently involves a control of condensation pressure on the outlet side of the scroll expander 3, and therefore the electric power generation output of the scroll expander 3 can be controlled. Whether to prioritize controlling the condensed water temperature or prioritize controlling the electric power generation output by the control unit 10 can be adjusted by appropriately changing setting of the control unit 10 in accordance with demands.

The control unit 10 is configured to control the rotational frequency of the condensed water pump P2 based on a result of detection of the liquid level L which is obtained from the liquid level detection sensor S, thereby adjusting the amount of condensed water to be sent to the outside of the container body 50, thus maintaining the amount of liquid phase to such an extent that water vapor that is constantly discharged from the introduction pipe 53 into the container body 50 can bubble in the liquid phase. This control enables the control unit 10 to keep the water vapor and the cooling water in a successfully mixed state, and to maintain a safe operation of the condensation device 5.

Figure 2A:
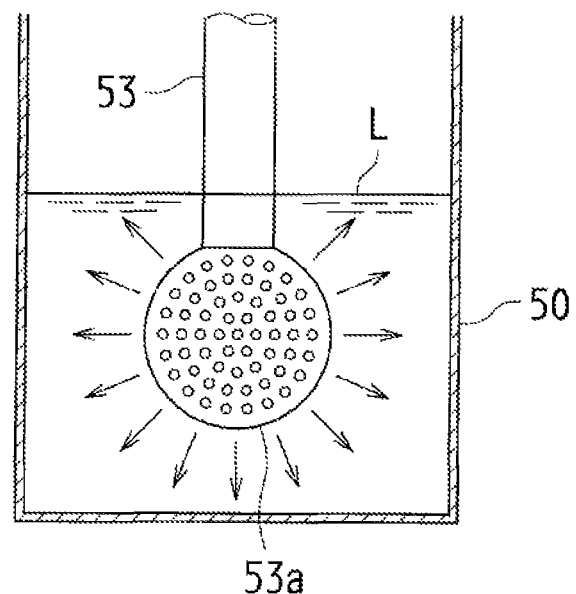
FIG. 2A and FIG. 2B Diagrams, each schematically showing another embodiment of a distal end portion of an introduction pipe of the power generation apparatus of the present invention.
Figure 2B:
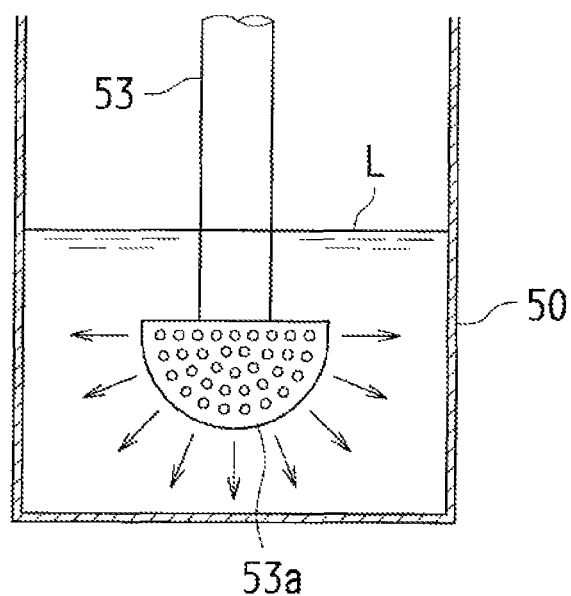

Although this embodiment is configured to suppress noises and pressure fluctuations by the condensation device 5 allowing the water vapor discharged from the introduction pipe 53 to be finely dispersed into bubbling in the liquid phase; such fine dispersion and bubbling may not be essential when the water vapor has a relatively low temperature or when an expander 3 less susceptible to condensation pressure is adopted. The distal end portion 53a of the introduction pipe 53, which has its cylindrical portion horizontally arranged with many perforations formed in an outer peripheral surface thereof, is configured to allow water vapor to be finely dispersed from the many perforations into bubbling. Here, the shape of the distal end portion 53a is not particularly limited. For example, as shown in FIG. 2A and FIG. 2B, a spherical portion provided in the distal end portion 53a may have many perforations formed throughout an outer peripheral surface thereof such that water vapor be finely dispersed into bubbling in all directions in the liquid phase, or a diameter-expanded hemispherical portion provided in the distal end portion 53a may have many perforations formed in a spherical surface thereof such that water vapor be finely dispersed into bubbling in directions against the liquid level L of the liquid phase.

Figure 3:
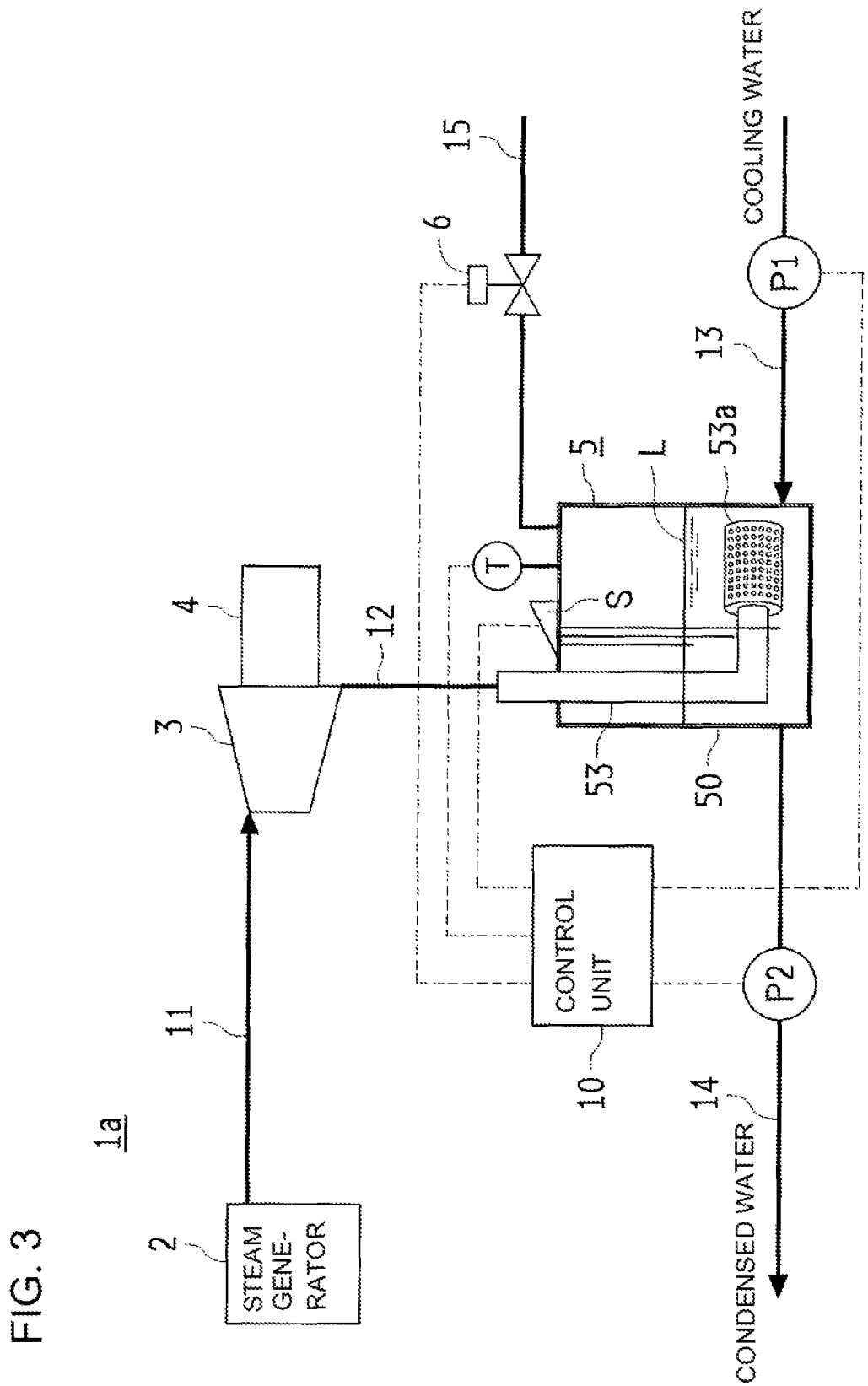
FIG. 3 A diagram schematically showing an overall configuration of a power generation apparatus according to another embodiment of the present invention.

FIG. 3 shows a power generation apparatus 1a according to another embodiment of the present invention. In FIG. 3, the same members as those of the power generation apparatus 1 shown in FIG. 1 are given the same reference signs, and descriptions thereof are omitted.

The power generation apparatus 1a is identical to the above-described power generation apparatus 1 shown in FIG. 1, except that an atmospheric air release path 15 having an atmospheric air release valve 6 is provided on an upper surface of the container body 50 of the condensation device 5.

In the container body 50, the water vapor and the cooling water are directly mixed so that a water vapor gas is condensed into a liquid, but a non-condensable gas which is a gas failing to be condensed into a liquid accumulates as time elapses. The accumulation of the non-condensable gas in the container body 50 makes it difficult for the control unit 10 to control the condensation pressure.

In this respect, a control unit 10 of the power generation apparatus 1a according to the present invention is configured to perform the following control at a time of start-up.

The control unit 10 of the power generation apparatus 1a, at a time of start-up, rotates the cooling water pump P1 to charge the cooling water into the container body 50 through the cooling water supply path 13, and opens the atmospheric air release valve 6. By raising the liquid level L in the container body 50, the control unit 10 discharges the non-condensable gas accumulated in the container body 50 to the outside of the container body 50 through the atmospheric air release path 15.

After discharging the non-condensable gas, the control unit 10 closes the atmospheric air release valve 6, and rotates the condensed water pump P2, to discharge the cooling water charged in the container body 50 to the outside until the liquid level L in the container body 50 reaches a predetermined level. The sequence of operations is performed based on a result of detection of the liquid level L which is obtained from the liquid level detection sensor S.

Then, the control unit 10 stops the condensed water pump P2, and starts to supply water vapor from the steam generator 2 to the scroll expander 3, thus starting generation of electric power and preparation of condensed water. Then, as described above, the control unit 10 controls the condensed water temperature or controls the electric power generation output based on a result of detection of the condensed water temperature which is obtained from the temperature sensor T. At this time, whether to prioritize controlling the condensed water temperature or prioritize controlling the electric power generation output is adjusted by appropriately changing setting of the control unit 10 in accordance with demands.

The power generation apparatus 1a, which is able to discharge the non-condensable gas accumulated in the container body 50 to the outside without using a vacuum pump at a time of start-up, can simplify the apparatus configuration because no vacuum pump is used. In addition, since the non-condensable gas is discharged to the outside of the container body 50, the condensation pressure during operation can be controlled well, so that the electric power generation output can be controlled comfortably.

In each of the embodiments described above, the power generation apparatus 1, 1a adopts the scroll expander 3. This expander may be a screw expander, a vane expander, a reciprocating expander, a swash plate expander, or the like.

In each of the embodiments described above, the power generation apparatus 1, 1a is configured such that the control unit 10 controls the rotational frequency of the cooling water pump P1, thereby controlling the amount of cooling water to be supplied from the cooling water supply path 13 into the container body 50. Here, in a case where water pressure is already applied to the cooling water supply path 13, a flow control valve (not shown) may be adopted instead of the cooling water pump P1.

It should be noted that the present invention may be embodied in many different forms without departing from the spirit or essential characteristics thereof. The above-described embodiments are therefore to be considered in all respects only as illustrative and not restrictive. The scope of the present invention is defined by the claims, and never bound by the description. All modifications and changes which come within the scope of the claims are to be embraced by the present invention.

REFERENCE SIGNS LIST 1 power generation apparatus
1a power generation apparatus
10 control unit
11 supply path
12 discharge path
15 atmospheric air release path
2 steam generator
3 scroll expander (expander)
4 generator
5 condensation device
53 introduction pipe
6 atmospheric air release valve
L liquid level
S liquid level detection sensor
P cooling water pump

The invention claimed is:

1. A power generation apparatus configured such that water vapor generated in a steam generator is supplied to an expander to drive the expander, the power generation apparatus comprising:
a condensation device coupled to a path downstream of the expander, the condensation device having a container body and being configured to, within the container body, mix water vapor having passed through the expander directly with cooling water to condense the water vapor, and
a control unit configured to adjust an amount of the cooling water supplied to the condensation device so as to obtain condensed water having a predetermined temperature;
an air release path including an air release valve connected to an upper portion of the condensation device;
wherein the control unit is configured to, at a time of start-up:
rotate a cooling water pump to charge the cooling water into the container body, thereby raising a liquid level within the container body; and
open the air release valve such that, in response to the rise of the liquid level within the container body, non-condensable gas accumulated within the container body is discharged out of the container body through the air release path.

2. The power generation apparatus according to claim 1, wherein:
the condensation device comprises means for detecting a liquid level within the condensation device, and
the control unit is configured to control, based on the liquid level, a rotational frequency of a pump that is configured to send liquid out of the condensation device.

3. The power generation apparatus according to claim 1, wherein:
a water vapor introduction pipe coupled to the path downstream of the expander extends into the condensation device, and
the introduction pipe has a plurality of perforations formed below a predetermined liquid level such that bubbling occurs in a liquid phase below the predetermined liquid level in the condensation device.

4. The power generation apparatus according to claim 3, wherein an air release path including an air release valve is connected to an upper portion of the condensation device.

5. The power generation apparatus according to claim 2, wherein:
a water vapor introduction pipe coupled to the path downstream of the expander extends into the condensation device, and
the introduction pipe has a plurality of perforations formed below a predetermined liquid level such that bubbling occurs in a liquid phase below the predetermined liquid level in the condensation device.

6. The power generation apparatus according to claim 5, wherein an air release path including an air release valve is connected to an upper portion of the condensation device.

7. The power generation apparatus according to claim 2, wherein an air release path including an air release valve is connected to an upper portion of the condensation device.

8. The power generation apparatus according to claim 1, wherein the expander is a scroll expander.

9. A power generation apparatus configured to supply water vapor to an expander to drive the expander, the power generation apparatus comprising:
a condensation device coupled to a path downstream of the expander, the condensation device having a container body and being configured to, within the container body, mix water vapor having passed through the expander with cooling water to condense the water vapor, and
a control unit configured to adjust an amount of cooling water supplied to the condensation device;
an air release valve in fluid communication with the condensation device and configured to control air flow out of the condensation device;
wherein the control unit is configured to, at a time of start-up:
rotate a cooling water pump to deliver the cooling water into the container body, thereby raising a level of liquid within the container body; and
actuate the air release valve such that, in response to the rise of the liquid level within the container body, non-condensable gas accumulated within the container body is discharged out of the container body through the air release valve.

10. The power generation apparatus of claim 9, wherein the control unit is configured to:
receive data indicative of a temperature of the liquid within the container body; and
based on the received data indicative of the temperature of the liquid, rotate the cooling water pump to deliver the cooling water into the container body.

11. The power generation apparatus of claim 10, wherein the control unit is configured to:
receive data indicative of the level of the liquid within the container body; and
based on the received data indicative of the level of the liquid, rotate a second pump to discharge liquid out of the container body.

12. A system comprising:
a power generation apparatus configured to supply water vapor to an expander, power generation apparatus comprising:
a condensation device coupled downstream of the expander, the condensation device configured to condense water vapor from the expander with liquid; and
a control device configured to:
initiate delivery of the liquid to the condenser to raise a level of fluid within the condenser; and
initiate actuation of an air release valve coupled to the condenser to enable discharge of non-condensable gas accumulated within the condenser responsive to rise of the level of the fluid within the condenser.

13. The system of claim 12, wherein the condensation device comprises a container body.

14. The system of claim 13, wherein the condensation device is configured to, within the container body, mix the water vapor with the liquid.

15. The system of claim 12, further comprising a temperature sensor configured to generate data indicative of a temperature of the fluid within the condenser.

16. The system of claim 15, further comprising a first pump configured to enable delivery of the liquid to the condenser.

17. The system of claim 16, wherein the control device is further configured to:
receive the data from the temperature sensor; and
based data, initiate operation of the first pump to cause delivery of the liquid to the condenser.

18. The system of claim 17, wherein the control device is configured to:
   receive data indicative of the level of the liquid within the condensation device; and
   based on the received data indicative of the level of the liquid, rotate a second pump to discharge liquid out of the condensation device.

19. The system of claim 12, further comprising:
   the expander;
   the air release valve; and
   a steam generator configured to generate water vapor supplied to the expander to drive the expander.

* * * * *